United States Patent
Sud et al.

(10) Patent No.: US 12,469,256 B2
(45) Date of Patent: Nov. 11, 2025

(54) PERFORMANCE OF COMPLEX OPTIMIZATION TASKS WITH IMPROVED EFFICIENCY VIA NEURAL META-OPTIMIZATION OF EXPERTS

(71) Applicant: Google LLC, Mountain View, CA (US)

(72) Inventors: Avneesh Sud, Belmont, CA (US); Andrea Tagliasacchi, Toronto (CA); Ben Usman, Boston, MA (US)

(73) Assignee: GOOGLE LLC, Mountain View, CA (US)

( * ) Notice: Subject to any disclaimer, the term of this patent is extended or adjusted under 35 U.S.C. 154(b) by 401 days.

(21) Appl. No.: 17/870,462

(22) Filed: Jul. 21, 2022

(65) Prior Publication Data

US 2023/0040793 A1    Feb. 9, 2023

Related U.S. Application Data

(60) Provisional application No. 63/224,079, filed on Jul. 21, 2021.

(51) Int. Cl.
*G06V 10/77* (2022.01)
*G06N 5/022* (2023.01)
*G06T 7/70* (2017.01)

(52) U.S. Cl.
CPC ......... *G06V 10/7715* (2022.01); *G06N 5/022* (2013.01); *G06T 7/70* (2017.01); *G06T 2207/20084* (2013.01); *G06V 2201/07* (2022.01)

(58) Field of Classification Search
CPC ........... G06V 10/7715; G06V 2201/07; G06V 10/809; G06V 10/82; G06V 20/647; G06V 40/103; G06N 5/022; G06N 3/0895; G06N 3/09; G06N 3/096; G06N 3/049; G06N 3/084; G06T 7/70; G06T 2207/20084
USPC ........................................................ 382/156
See application file for complete search history.

(56) References Cited

U.S. PATENT DOCUMENTS

| | | | |
|---|---|---|---|
| 10,713,794 B1* | 7/2020 | He | G06N 3/084 |
| 11,238,650 B2* | 2/2022 | Li | G06T 7/74 |
| 2019/0138786 A1* | 5/2019 | Trenholm | G06F 18/241 |
| 2020/0357111 A1* | 11/2020 | Wang | G06T 7/0002 |

(Continued)

OTHER PUBLICATIONS

Agarwal et al, "Building Rome in a Day", Communications of the ACM, vol. 54, No. 10, Oct. 2011, 8 pages.

(Continued)

*Primary Examiner* — Ali Bayat
(74) *Attorney, Agent, or Firm* — DORITY & MANNING P.A.

(57) ABSTRACT

Example systems perform complex optimization tasks with improved efficiency via neural meta-optimization of experts. In particular, provided is a machine learning framework in which a meta-optimization neural network can learn to fuse a collection of experts to provide a predicted solution. Specifically, the meta-optimization neural network can learn to predict the output of a complex optimization process which optimizes over outputs from the collection of experts to produce an optimized output. In such fashion, the meta-optimization neural network can, after training, be used in place of the complex optimization process to produce a synthesized solution from the experts, leading to orders of magnitude faster and computationally more efficient prediction or problem solution.

16 Claims, 10 Drawing Sheets

(56) References Cited

U.S. PATENT DOCUMENTS

| | | | |
|---|---|---|---|
| 2021/0192136 A1* | 6/2021 | Sar Shalom | ........ G06F 16/3334 |
| 2022/0232162 A1* | 7/2022 | Gupta | .................. G06F 16/538 |

OTHER PUBLICATIONS

Belagiannis et al, "3D Pictorial Structures for Multiple Human Pose Estimation", Conference on Computer Vision and Pattern Recognition, Jun. 23-28, 2014, Columbus, Ohio, United States, 8 pages.

Branch et al, "A Subspace, Interior, and Conjugate Gradient Method for Large-Scale Bound-Constrained Minimization Problems", SIAM Journal on Scientific Computing, vol. 21, Issue 12, 1999 29 pages.

Bridgeman et al, "Multi-Person 3D Pose Estimation and Tracking in Sports", Conference on Computer Vision and Pattern Recognition, Jun. 16-20, 2019, Long Beach, California, United States, 10 pages.

Byrd et al, "Approximate Solution of the Trust Region Problem by Minimization over Two-Dimensional Subspace". Mathematical Programming, Oct. 1988, 31 pages.

Chen et al, "Cross-View Tracking for Multi-Human 3D Pose Estimation at Over 100 FPS", Conference on Computer Vision and Pattern Recognition, Jun. 14-19, 2020, Virtual, pp. 3279-3288.

Chen et al, "Unsupervised 3D Pose Estimation with Geometric Self-Supervision", arXiv:1904.04812v1, Apr. 9, 2019, 11 pages.

Deng et al, "Vector Neurons: A General Framework for so (3)-Equivariant Networks", arXiv:2104.12229v1, Apr. 25, 2021, 12 pages.

Drover et al, "Can 3D Pose be Learned from 2D Projections Alone?", European Conference on Computer Vision. Sep. 8-14, 2018, Munich, Germany, 17 pages.

Feng et al, "Hgaze Typing: Head-Gesture Assisted Gaze Typing", Symposium on Eye Tracking Research and Applications, May 25-27, 2021, Virtual, 11 pages.

Frisch et al, "Gaussian Mixture Estimation from Weighted Samples", arXiv:2106.05109v1, Jun. 9, 2021 7 pages.

Gleicher, "Animation from Observation: Motion Capture and Motion Editing", Computer Graphics, vol. 33, No. 4, Jul. 2014, 5 pages.

Gu et al, "Home-Based Physical Therapy with an Interactive Computer Vision System", International Conference on Computer Vision, 2019, Oct. 27-Nov. 2, 2019, Seoul, Korea, 10 pages.

Guler et al, "Densepose: Dense Human Pose Estimation in the Wild", arXiv:1802.00434v1, Feb. 1, 2018, 12 pages.

Guler et al, "Holopose: Holistic 3D Human Reconstruction In-The-Wild", Conference on Computer Vision and Pattern Recognition, Jun. 16-20, 2019, Long Beach, California, United States, pp. 10884-10894.

He et al, "Epipolar Transformers", Conference on Computer Vision and Pattern Recognition, Jun. 14-19, 2020, Virtual, pp. 7779-7788.

Ionescu et al, "Human3 6m: Large Scale Datasets and Predictive Methods for 3D Human Sensing in Natural Environments", Transactions on Pattern Analysis and Machine Intelligence, Sep. 2014, 15 pages.

Iqbal et al, "Weakly Supervised 3D Human Pose Learning via Multi-View Images in the Wild", arXiv:2003.07581v1, Mar. 17. 2020, 11 pages.

Iskakov et al, "Learnable Triangulation of Human Pose", arXiv:1905.05754v1, May 14, 2019, 9 pages.

Jakab et al, "Self-Supervised Learning of Interpretable Keypoints from Unlabelled Videos". arXiv:1907.02055v2. Dec. 23, 2020, 21 pages.

Jedlovec, "Introducing Statcast 2020: Hawk-Eye and Google Cloud", MLB Technology Blog, Jul. 20, 2020, https://technology.mlblogs.com/introducing-statcast-2020-hawk-eye-and-google-cloud-a5f5c20321b8, retrieved on Aug. 24, 2022, 8 pages.

Joo et al, "Exemplar Fine-Tuning for 3D Human Model Fitting Towards in-the-Wild 3D Human Pose Estimation", arXiv:2004.03686v3, Oct. 22, 2021, 21 pages.

Joo et al, Panoptic Studio: A Massively Multiview System for Social Interaction Capture, arXiv:1612.03153v1, Dec. 9, 2016, 14 pages.

Joseph-Rivlin et al, "Momen(e)t: Flavor the Moments in Learning to Classify Shapes", arXiv:1812.07431v2, Oct. 3, 2019, 10 pages.

Kanazawa et al, "End-to-End Recovery of Human Shape and Pose", arXiv:1712.06584v2, Jun. 23, 2018, 10 pages.

Karashchuk et al, "Anipose: a Toolkit for Robust Markerless 3D Pose Estimation", Cell Reports, vol. 36, Issue 13, Sep. 28, 2021, 53 pages.

Kingma et al, "Adam: A Method for Stochastic Optimization", arXiv:1412.6980v9, Jan. 30, 2017, 15 pages.

Kocabas et al, "Self-Supervised Learning of 3D Human Pose using Multi-View Geometry", arXiv:1903.02330v2, Apr. 9, 2019, 10 pages.

Kocabas et al, "Vibe: Video Inference for Human Body Pose and Shape Estimation", arXiv:1912.05656v3, Apr. 29, 2020, 12 pages.

Kolotouros et al, "Learning to Reconstruct 3D Human Pose and Shape via Model-Fitting in the Loop", arXiv:1909.12828v1, Sep. 27, 2019, 10 pages.

Kundu et al, "Self-Supervised 3D Human Pose Estimation via Part Guided Novel Image Synthesis", Conference on Computer Vision and Pattern Recognition, Jun. 14-19, 2020, Virtual, pp. 6152-6162.

Ma et al, "Deep Feedback Inverse Problem Solver", arXiv:2101.07719v1, Jan. 19, 2021, 18 pages.

Martinez et al, "A Simple Yet Effective Baseline for 3D Human Pose Estimation", arXiv:1705.03098v2, Aug. 4, 2017, 10 pages.

Mitra et al, "Multiview-Consistent Semi-Supervised Learning for 3D Human Pose Estimation", Conference on Computer Vision and Pattern Recognition, Jun. 14-19, 2020, Virtual, pp. 6907-6916.

Newell et al, "Stacked Hourglass Networks for Human Pose Estimation", arXiv:1603.06937v2, Jul. 26, 2016, 17 pages.

Papandreou et al, "Person-Lab: Person Pose Estimate and Instance Segmentation with a Bottom-Up, Part-Based, Geometric Embedding Model", arXiv:1803.08225v1, Mar. 22, 2018, 21 pages.

Rhodin et al, "Learning Monocular 3D Human Pose Estimation from Multi-View Images", arXiv:1803.04775v2, Mar. 24, 2018, 10 pages.

Rhodin et al, "Unsupervised Geometry-Aware Representation for 3D Human Pose Estimation", arXiv:1804.01110v1, Apr. 3, 2018, 17 pages.

Rosales et al, "Estimating 3D Body Pose using Uncalibrated Cameras", Boston University Technical Report, No. 2001-008, Jun. 2001, 8 pages.

Saraee et al, "Exercisecheck: Data Analytics for a Remote Monitoring and Evaluation Platform for Home-Based Physical Therapy", Conference on Pervasive Technologies Related to Assistive Environments, Jun. 29-Jul. 1, 2019, Corfu, Greece, 9 pages.

Schonemann, "A Generalized Solution of the Orthogonal Procrustes Problem", Psychometrika, vol. 31, No. 1, Mar. 1966, 10 pages.

Takahashi et al, "Human Pose as Calibration Pattern: 3D Human Pose Estimation with Multiple Unsynchronized and Uncalibrated Cameras", Conference on Computer Vision and Pattern Recognition, Jun. 18-22, 2018, Salt Lake City, Utah, United States, pp. 1888-1895.

Tu et al, "Voxelpose: Towards Multi-Camera 3D Human Pose Estimation in Wild Environment", arXiv:2004.06239v4, Aug. 24, 2020, 17 pages.

Wandt et al, "CanonPose: Self-Supervised Monocular 3d Human Pose Estimation in the Wild", Conference on Computer Vision and Pattern Recognition, Jun. 19-25, 2021, Nashville, Tennessee, United States, pp. 13294-13304.

Wandt et al, "Repent: Weakly Supervised Training of an Adversarial Reprojection Network for 3D Human Pose Estimation", arXiv:1902.09868v2, Mar. 12, 2019, 10 pages.

Xie et al, "MetaFuse: A Pre-Trained Fusion Model for Human Pose Estimation", Conference on Computer Vision and Pattern Recognition, Jun. 14-19, 2020, Virtual, pp. 13686-13695.

Zanfir et al, "Neural Descent for Visual 3D Human Pose and Shape", arXiv:2008.06910v2, Jun. 14, 2021, 10 pages.

Zanfir et al, "Weakly Supervised 3D Human Pose and Shape Reconstruction with Normalizing Flows", European Conference on Computer Vision, Aug. 23-28, 2020, Virtual, 17 pages.

Zhou et al, "Fast Global Registration", European Conference on Computer Vision, Oct. 8-16, 2016, Amsterdam, The Netherlands, 16 pages.

(56) References Cited

OTHER PUBLICATIONS

Zhou et al, "On the Continuity of Rotation Representations in Neural Networks", arXiv:1812.07035v4, Jun. 8, 2020, 13 pages.
Zhou et al, "Towards 3D Human Pose Estimation in the Wild: A Weakly-Supervised Approach", arXiv:1704.02447v2, Jul. 30, 2017, 10 pages.

* cited by examiner

PERFORMANCE OF COMPLEX OPTIMIZATION TASKS WITH IMPROVED EFFICIENCY VIA NEURAL META-OPTIMIZATION OF EXPERTS

PRIORITY CLAIM

The present application is based on and claims priority to U.S. Provisional Application 63/224,079 having a filing date of Jul. 21, 2021, which is incorporated by reference herein in its entirety.

FIELD

The present disclosure relates generally to machine learning. More particularly, the present disclosure relates to performance of complex optimization tasks with improved efficiency via neural meta-optimization of experts.

BACKGROUND

Optimization problems arise in many disciplines from computer science and engineering to operations research and more. In the simplest case, an optimization problem consists of maximizing or minimizing a real function by systematically choosing input values from within an allowed set and computing the value of the function. The generalization of optimization theory and techniques to other formulations constitutes a large area of applied mathematics. More generally, optimization includes finding "best available" values of some objective function given a defined domain (or input), including a variety of different types of objective functions and different types of domains.

In some examples, researchers may use iterative optimization techniques that converge to a solution (on some specified class of problems) or heuristic optimization techniques that may provide approximate solutions to some problems (although their iterates need not converge). In some examples, certain programs or approaches which may be referred to as "solvers" can be used to perform or "solve" the optimization technique.

Typically, optimization techniques for any not-insignificant problem are highly computationally complex, requiring large amounts of computational power for a significant period of time. This computational complexity limits the application of optimization techniques to certain problems or in certain settings where computational resources are limited and/or latency is key. One example setting of this nature is on typical mobile or embedded devices which have limited computational resources such as processor power and/or memory and for which latency is often a driver of user adoption.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for performing complex optimization tasks with improved efficiency or accuracy. The method includes obtaining, by a computing system comprising one or more computing devices, a set of input data. The method includes processing, by the computing system, the input data with one or more existing expert models to generate one or more expert outputs. The method includes processing, by the computing system, the one or more expert outputs with a meta-optimization neural network to generate a predicted output. The method includes performing, by the computing system, an optimization technique on the one or more expert outputs to generate an optimized output. The method includes modifying, by the computing system, one or more learnable parameters of the meta-optimization neural network based at least in part on a loss function that compares the predicted output with the optimized output.

Another example aspect of the present disclosure is directed to a computing system. The computing system includes one or more processors and one or more non-transitory computer-readable media that collectively store instructions that, when executed by the one or more processors, cause the computing system to perform operations. The operations include obtaining a set of input data. The operations include processing the input data with one or more existing expert models to generate one or more expert outputs. The operations include processing the one or more expert outputs with a meta-optimization neural network to generate a predicted output. The meta-optimization neural network has been trained to generate the predicted output by performance of a supervised learning approach relative to optimized outputs generated by performance of an optimization technique on initial inputs generate by the one or more existing expert models.

Another example aspect of the present disclosure is directed to one or more non-transitory computer-readable media that collectively store instructions that, when executed by one or more processors, cause a computing system to perform operations. The operations include obtaining, by the computing system, a plurality of images that depict a scene. The operations include processing, by the computing system, the plurality of images with one or more existing expert models to generate a plurality of features detected in the plurality of images. The operations include processing, by the computing system, the plurality of images with a meta-optimization neural network to generate a predicted output. The predicted output includes a predicted geometry of the plurality of images relative to the scene. The operations include performing, by the computing system, a bundle adjustment technique on the plurality of features to generate the optimized output, wherein the optimized output comprises an optimized geometry of the plurality of images relative to the scene. The operations include modifying, by the computing system, one or more learnable parameters of the meta-optimization neural network based at least in part on a loss function that compares the predicted geometry of the plurality of images with the optimized geometry of the plurality of images relative to the scene.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
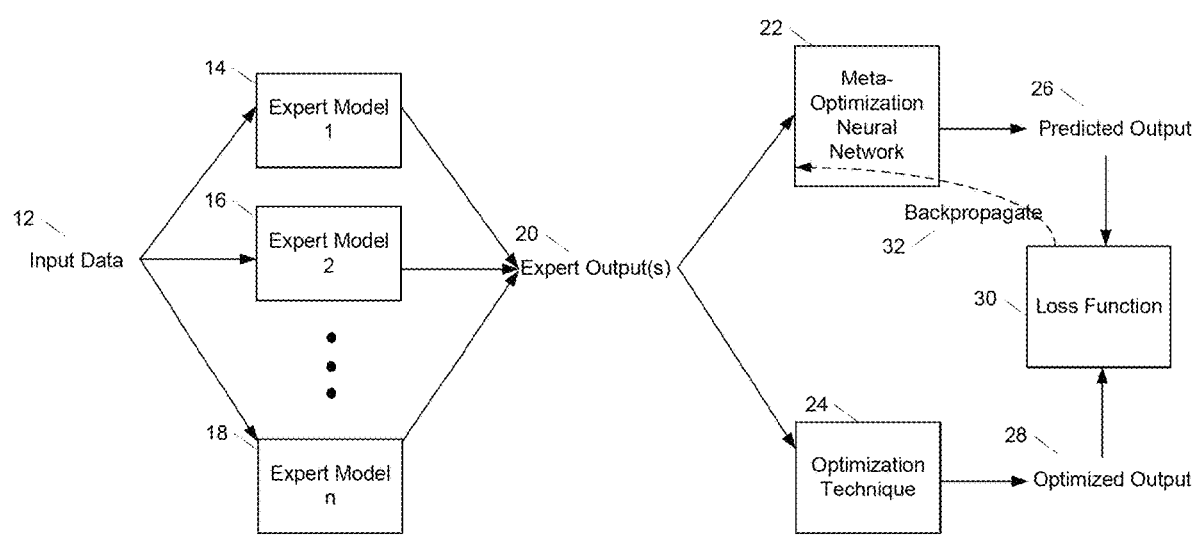
FIG. 1 depicts a block diagram of an example training process for training a neural meta-optimizer according to example embodiments of the present disclosure.

Reference numerals that are repeated across plural figures are intended to identify the same features in various implementations.

DETAILED DESCRIPTION

Overview

Generally, the present disclosure is directed to performance of complex optimization tasks with improved efficiency via neural meta-optimization of experts. In particular, example aspects of the present disclosure provide a machine learning framework in which a meta-optimization neural network can learn to fuse a collection of experts to provide a predicted solution. Specifically, the meta-optimization neural network can learn to predict the output of a complex optimization process which optimizes over outputs from the collection of experts to produce an optimized output. In such fashion, the meta-optimization neural network can, after training, be used in place of the complex optimization process to produce a synthesized solution from the experts, leading to orders of magnitude faster and computationally more efficient prediction or problem solution and/or more accurate solution.

Specifically, in some implementations, the neural optimizer can learn data priors to regularize the solution which a non-learning based optimizer may not be able to exploit. Also, the meta optimizer can effectively incorporate uncertainty in the experts' outputs, and correct mistakes in expert output using the priors from the data, which an optimizer may not be able to do.

To provide one example use case (of which there are many), the proposed systems and methods can be applied to perform human pose as a bundle adjustment in a neural network (which can also be referred to as a "neural bundle adjustment"). More particularly, given a set of images depicting a number of 3D points from different viewpoints, bundle adjustment can be defined as the problem of simultaneously refining the 3D coordinates describing the scene and/or the cameras. When applied to human pose as described herein, the 3D coordinates describing the scene can be parameterized as keypoints (e.g., joint locations) on a human body depicted in the images. Bundle adjustment techniques typically include performing a relatively computationally-demanding optimization process in which the 3D coordinates and/or the viewpoints of the images are iteratively adjusted to maximize consistency.

To continue the example application of the proposed meta-optimization approach to this example use case, the images can first be supplied to a collection of existing expert models. For example, the expert models can be existing/pre-trained machine-learned models such as object detection models, keypoint detection models (e.g., in the form of probability heatmaps for each joint), pose estimation models, etc. The expert models can also include various heuristics and/or algorithms which produce an initial, but non-optimal output.

An optimization technique can be performed to generate an optimized output from the expert outputs generated by the collection of experts. As one example for the given use case, the human pose (e.g., 3D pose) and camera viewpoint locations can be iteratively refined to maximize a likelihood of re-projected points. For example, gradient descent can be iteratively applied to generate an optimized output (e.g., an optimal human pose).

For the purpose of training the meta-optimization neural network, the meta-optimization neural network can process the expert outputs generated by the collection of experts to generate a predicted output (e.g., a predicted human pose). A loss function (e.g., a "teacher loss") can compare the optimized output with the predicted output to generate a loss signal. The loss function can be backpropagated through the meta-optimization neural network to modify (e.g., iteratively optimize) the parameters of the meta-optimization neural network.

When available, the neural network can additionally or alternatively be trained using ground truth outputs (e.g., ground truth human poses such as ground truth 2D and/or 3D pose data). For example, a loss (e.g., a "ground truth loss" or "reprojection loss") can compare the predicted output (e.g., a projection of the predicted output) with the ground truth output. The loss function can be backpropagated through the meta-optimization neural network to modify (e.g., iteratively optimize) the parameters of the meta-optimization neural network.

In such fashion, the meta-optimization neural network can be trained to predict the output of the complex optimization process, thereby enabling replacement of the complex optimization process when trained. In particular, when applied to the example use case of neural human pose bundle adjustment, the proposed framework can train a neural model to perform accurate 3D (human) pose and camera estimation, takes into account joint location uncertainty due to occlusion from multiple views, and requires only 2D keypoint data for training.

In addition to the loss terms described above, another modular aspect of the proposed framework enables the inclusion of any number of additional loss terms that encode any number of priors regarding the output (e.g., regarding the structure of the output, magnitude of the output, etc.). To provide one example for the example use case described above, an additional loss term may be used which encodes prior knowledge about bone length (e.g., bone length of humans aggregately or bone length of the human depicted in the imagery). Thus, for example, the loss term can penalize post predictions which deviate from a range of acceptable bone lengths).

The proposed neural meta-optimization over a collection of experts provides a number of technical effects and benefits. As one example technical effect, once trained, the meta-optimization neural network can be used rather than a computationally complex optimization process (e.g., as a replacement therefor). This results in conservation of computing resources such as processor usage, memory usage, and/or network bandwidth.

As another example technical effect and benefit, the proposed meta-optimization approach is highly modular in design. In particular, if and when a new expert model becomes available updated when new experts become available (e.g., due to an advance in the underlying art and/or a newly available dataset), the new expert can simply be added to the collection of experts and the meta-optimization neural network can be re-trained (e.g., fine-tuned) to account for an expert output supplied by the new expert.

In a similar vein, the proposed framework also enables faster training because only a meta-optimizer neural network needs to be learned on top of good expert models. Thus, rather the entire pipeline does not need to be trained all at once end-to-end. Instead, the existence of high-performing expert models can be leveraged and only the meta-optimization model is trained, which can result in faster training with corresponding savings in computational resources such as reduced processor usage, memory usage, network bandwidth consumption, etc.

As another example technical effect and benefit, the proposed framework facilitates the inclusion of any number of loss terms which encode any number of priors regarding the predicted output. By inclusion of such priors, convergence to an optimal solution can be achieved more quickly, which can result in faster training with corresponding savings in computational resources such as reduced processor usage, memory usage, network bandwidth consumption, etc.

With reference now to the Figures, example embodiments of the present disclosure will be discussed in further detail.

Example Model Configurations

FIG. 1 depicts a block diagram of an example training process for training a neural meta-optimizer according to example embodiments of the present disclosure. In particular, as illustrated in FIG. 1, a computing system can obtain a set of input data 12. The set of input data 12 can be any form of input data including image data, textual data, audio data, etc.

The computing system can process the input data 12 with one or more existing expert models 14, 16, 18 to generate one or more expert outputs 20. The expert models 14, 16, 18 can be any form of expert approach such as previously trained machine-learned models, known heuristics, known algorithms, and/or other feature extraction approaches.

The computing system can process the one or more expert outputs 20 with a meta-optimization neural network 22 to generate a predicted output 26.

The computing system can also perform an optimization technique 24 on the one or more expert outputs 20 to generate an optimized output 28. As one example, the optimization technique 24 can be an iterative minimization or maximization technique. As further examples, the optimization technique 24 can be or include one or more of the following: Line Search Methods; Trust-Region Methods; Truncated Newton Methods; Difference Approximations; Quasi-Newton Methods; Nonlinear Conjugate Gradient Method; Nonlinear Simplex Method; Nonlinear Least-Squares Approaches; Bound Constrained Optimization; Linear Programming; Quadratic Programming, Nonlinear Programming, Semi-Infinite Programming; and/or others.

The computing system can modify one or more learnable parameters of the meta-optimization neural network 22 based at least in part on a loss function 30 that compares the predicted output 26 with the optimized output 24. For example, the computing system can backpropagate 32 the loss function 30 to train the network 22. In some implementations, the loss function 30 can also include one or more loss terms that encode one or more priors of the optimized output 28.

In some implementations, the input data 12 can include a sequence of inputs over time. In such implementations, the one or more expert outputs 20 can include a sequence of expert outputs respectively generated over time by the one or more existing experts from the sequence of inputs over time. In another example, the one or more expert outputs 20 can include one or more hyperpriors.

As one example application of the framework illustrated in FIG. 1, in some implementations, the input data 12 can include a plurality of images (e.g., monocular images) that depict a scene; the one or more expert outputs 20 can include a plurality of features detected in the plurality of images; and performing the optimization technique can include performing a bundle adjustment technique on the plurality of features to generate the optimized output 28. For example, the optimized output 28 can include a geometry of the plurality of images relative to the scene.

In one further example, the images can depict an object; the one or more expert outputs can be an initial predicted pose for the object; the predicted output can be a final predicted pose for the object; and the optimized output can be a refined pose for the object.

In a yet further example, the object can be a human body and the initial predicted pose, the final predicted pose, and the refined pose for the human body are parameterized using joint locations.

In another example, the scene can include any number of objects and the input data can be LiDAR data, RADAR data, and/or other forms of imagery or 3D data. In some of such implementations, the predicted output 26 and the optimized output 28 can be a bundle adjusted point cloud for the scene.

In some implementations, the one or more expert outputs 20 can have a same data structure as the optimized output 28 and the predicted output 26. Thus, in such implementations, the optimization technique 24 can refine the expert output 20 rather than generate a new data structure.

Although bundle adjustment is given as one example throughout this disclosure, the proposed framework can be applied to a number of different problems. As one example, the optimization technique can be an object tracking technique. As another example, the optimization technique can be a segmentation technique. As yet another example, the optimization technique can be a shape from shading technique.

Figure 2:
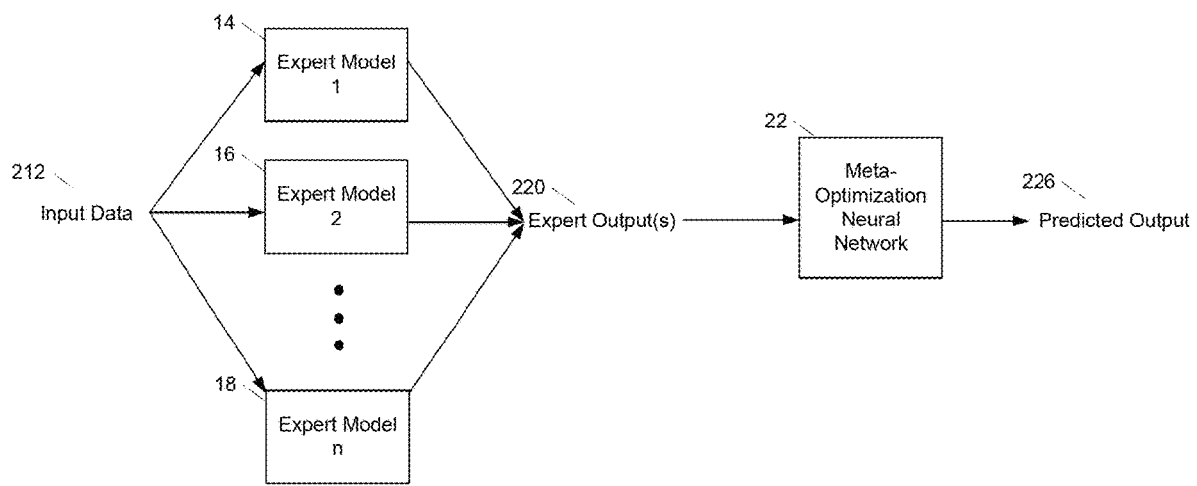
FIG. 2 depicts a block diagram of an example inference process with a trained neural meta-optimizer according to example embodiments of the present disclosure.

FIG. 2 depicts a block diagram of an example inference process with a trained neural meta-optimizer 22 according to example embodiments of the present disclosure (e.g., after training as shown in FIG. 1).

In particular, as illustrated in FIG. 2, a computing system can obtain a set of input data 212. The set of input data 212 can be any form of input data including image data, textual data, audio data, etc.

The computing system can process the input data 212 with one or more existing expert models 14, 16, 18 to generate one or more expert outputs 220. The expert models 14, 16, 18 can be any form of expert approach such as previously trained machine-learned models, known heuristics, known algorithms, and/or other feature extraction approaches.

The computing system can process the one or more expert outputs 220 with the trained meta-optimization neural network 22 to generate a predicted output 226.

Example Application to Three-Dimensional Pose

One example application of the general systems and methods provided herein is to three-dimensional (3D) post from multiple views without 3D supervision. Example implementations of the present disclosure that have been modified to fit this example application will now be discussed in detail for purpose of illustration. The systems and methods of the present disclosure are not limited to this example application.

More particularly, in the era of deep learning, human pose estimation from multiple cameras with unknown calibration has received little attention to date. This section shows how to train a neural model to perform this task with high precision and minimal latency overhead. The proposed model takes into account joint location uncertainty due to occlusion from multiple views, and requires only 2D keypoint data for training. The proposed method outperforms both classical bundle adjustment and weakly-supervised monocular 3D baselines on the well-established Human3.6M dataset, as well as the more challenging in-the-wild Ski-Pose PTZ dataset.

Overview of Three-Dimensional Pose Implementations

Example implementations tackle the problem of estimating 3D coordinates of human joints from RGB images captured using synchronized (potentially moving) cameras with unknown positions, orientations, and intrinsic parameters. Example implementations additionally assume having access to a training set with only 2D positions of joints labeled on captured images.

Historically, real-time capture of the human 3D pose has been undertaken only by large enterprises that could afford expensive specialized motion capture equipment. In principle, if camera calibrations are available, human body joints can be triangulated directly from camera-space observations. One scenario in which camera calibration cannot easily be estimated is sports capture, in which close-ups of players are captured in front of low-texture backgrounds, with wide-baseline, moving cameras. Plain backgrounds preclude calibration, as not sufficiently many feature correspondences can be detected across views.

Figure 3:
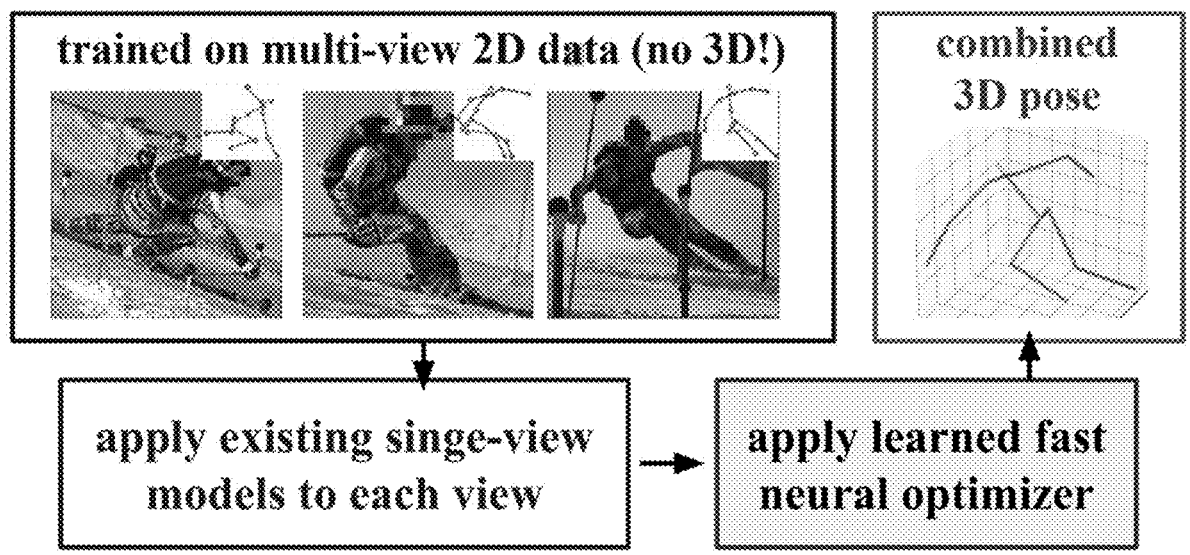
FIG. 3 shows how to train a neural network that can aggregate outputs of multiple single-view methods according to example embodiments of the present disclosure.

Aspects of the present disclosure propose a neural network to simultaneously predict 3D human and relative camera poses from multiple views; see FIG. 3. The proposed approach uses human body joints as a source of information for camera calibration. As joints often become occluded, uncertainty must be carefully accounted for, to avoid bad calibration and consequent erroneous 3D pose predictions. As a synchronized multi-camera setup at test-time may be present, the proposed algorithm should also be able to effectively aggregate information from different viewpoints. Finally, the proposed approach supervised by 2D annotations alone, as ground-truth annotation of 3D data is unwieldy. None of the existing approaches fully satisfies these fundamental requirements, as outlined below.

Fully-supervised 3D pose estimation approaches yield the lowest estimation error, but make use of known 3D camera specification during either training or both training and inference. However, the prohibitively high cost of 3D joint annotation and full camera calibration in-the-wild makes it difficult to acquire large enough labeled datasets representative of specific environments, therefore rendering supervised methods not applicable in this setup.

Monocular 3D methods, as well as 2D-to-3D lifting networks, relax data constraints to enable 3D pose inference using just multi-view 2D data without calibration at train time. Unfortunately, at inference time, these methods can only be applied to a single view at a time, therefore unable to leverage cross-view information and uncertainty.

Classical SfM (structure from motion) approaches to 3D pose estimation iteratively refine both the camera and the 3D pose from noisy 2D observations. However, these methods are often much slower than their neural counterparts, since they have to perform several optimization steps during inference. Further, most of them do not consider uncertainty estimates, resulting in sub-par performance.

To overcome these limitations, the present disclosure proposes a method for 3D pose estimation that aggregates pose predictions and uncertainty estimates across multiple views, requires no 3D joint annotations or camera parameters at both train and inference time, and adds very little latency to the resulting pipeline.

Specifically, FIG. 3 shows how to train a neural network that can aggregate outputs of multiple single-view methods, takes prediction uncertainty into consideration, has minimal latency overhead, and requires only 2D supervision for training. The proposed method mimics the structure of bundle-adjustment solvers, but using the joints of the human body to drive camera calibration, and by implementing a bundle-like solver with a simple feed-forward neural network.

Overall, provided is a feed-forward neural architecture that can accurately estimate the 3D human pose and the relative cameras configuration from multiple views, taking into account joint occlusions and prediction uncertainties, and uses only 2D joint annotations for training. Some example implementations employ an off-the-shelf weakly-supervised 3D network to form an initial guess about the pose and the camera setup, and a neural meta-optimizer that iteratively refines this guess using 2D joint location probability heatmaps generated by an off-the-shelf 2D pose estimation network. This modular approach not only yields low estimation error, leading to state-of-the-art results on Human3.6M and Ski-Pose PTZ, but also has low latency, as inference within the proposed framework executes as a feed-forward neural network.

Detailed Discussion of Three-Dimensional Pose Implementations

Figure 4:
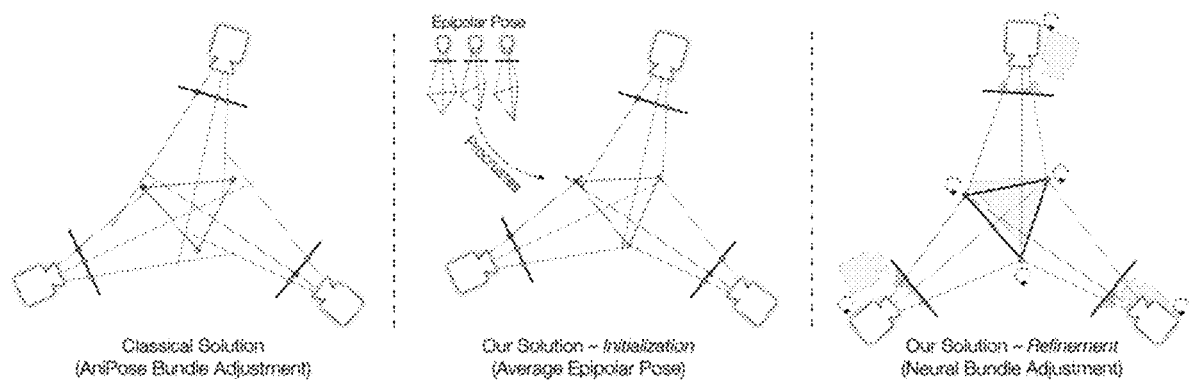
FIG. 4 illustrates an example method with a simple 2D example of regressing the 3D vertices of an equilateral triangle given multi-view observations according to example embodiments of the present disclosure.

FIG. 4 illustrates an example method with a simple 2D example of regressing the 3D vertices of an equilateral triangle given multi-view observations. Some example techniques (left) perform classical bundle adjustment to identify camera positions and 3D vertices that minimize reprojection error to 2D landmarks on the input images. Conversely, the proposed technique emulates classical bundle adjustment in a "neural" fashion by a meta-optimizer: first (middle), the EpipolarPose (Muhammed Kocabas, Salih Karagoz, and Emre Akbas. Self-supervised learning of 3d human pose using multi-view geometry. In *The IEEE Conference on Computer Vision and Pattern Recognition (CVPR)*, June 2019) neural network obtains a per-frame 3D estimate of the joints, which can be co-aligned via procrustes to estimate an initialization of both 3D cameras and 3D joints; then (right), a neural network meta-optimizer performs a bundle adjustment and refines both joints and cameras, using per-view keypoint localization heatmaps as input. Additional prior information, such as the fact that the triangle is equilateral, can be elegantly integrated in the meta-optimizer training.

More particularly, as illustrated in FIG. 4, given a collection of $\{\mathcal{J}_c\}$ images, example implementations seek to optimize, up to a global rotation, scale, and shift:

$J=\{j_j \in \mathbb{R}^3\}_{j=1}^{J}$: the 3D coordinates of 3D body joints, $C=\{c_c \in \mathbb{R}^P\}_{c=1}^{c}$: the cameras parameters.

Having also observed:

$H=\{c_c \in \mathbb{R}^{J \times H \times W}\}C=1$ a set of 2D heatmaps of locations on images $\{\mathcal{J}_c\}$ captured using these cameras, And assuming that, at training time, we are provided with:

$K=\{k_{j,c}\}$: the ground truth 2D locations of the projection of joint $j_c$ in camera $c_c$.

Bayesian model. Formally, assuming that heatmaps depend on camera parameters and joint positions J only through 2D keypoint locations (i.e. p(H|K, J, C)=p(H|K)), the joint distribution can be factorized as:

$$p(J,C,K,H)=p(H|K)p(K|J,C)p(J)p(C) \quad (1)$$

Joints and keypoints are assumed to be related by:

$$p(K \mid J, C) = \prod_{j,c} \delta(k_{j,c} - \pi(j_j, c_c)) \quad (2)$$

where $\delta$ is the Dirac distribution, and $\pi(j, c)$ projects a joint j to the 2D coordinates in camera c. Example implementations use a weak-projection camera model, hence, each camera is defined by a tuple of rotation matrix R, pixel shift vector t, and single scale parameter s, i.e. c=[R,t,s], and the projection operator is defined as $\pi(j, (R,t,s))=s \cdot I_{\{0:1\}} \cdot R \cdot j + t$ where $I_{[0:1]}$ is a truncated identity matrix that discards the third dimension of the multiplied vector. This choice of the camera model simplifies initialization of camera parameters from single-view estimates and eliminates the ambiguity in focal length-vs-distance to the camera.

Inference task. The inference task is then to estimate the J and C from observed heatmaps H. This section first introduce a probabilistic bundle adjustment formulation to handle joint position uncertainty, then proposes a regression model that models complex interactions between joint positions and observed heatmaps. The overall inference task can be framed as finding the maximum of the posterior probability of the pose and camera parameters given observed heatmaps, marginalized over possible keypoint locations:

$$\max_{J,C} p(J, C \mid H) = \int \frac{p(k \mid H)p(k \mid J, C)p(J)p(C)}{p(k)} dk \quad (3)$$

where, assuming that no prior information over camera parameters, keypoint locations, and poses is given (i.e. constant p(C), p(K) and p(J)) and using (2) we get:

$$p(J, C \mid H) \propto \prod_{c,j} p(k_{j,c} = \pi(j_j, c_c) \mid H) \quad (4)$$

Further, assuming that each keypoint $k_{c,j}$ is affected only by a corresponding heatmap $h_{c,j}$, and more specifically that the conditional probability density is proportional to the corresponding value of the heatmap:

$$p(k_{j,c}|H)=p(k_{j,c}|h_{j,c}) \propto h_{j,c}[k_{j,c}] \quad (5)$$

we get a probabilistic bundle adjustment problem:

$$\max_{J,C} \prod_{c,j} h_{j,c}[\pi(j_j, c_c)] \quad (6)$$

Better estimation accuracy with faster inference time can be achieved if it is assumed that each keypoint can be affected by any heatmap via the following functional relation up to a normally distributed residual:

$$p(K|H,\theta) = \mathcal{N}(K|(\pi J_\theta(H), C_\theta(H)), I) \quad (7)$$

where $J_\theta$, $C_\theta$ are joint and camera regression models (e.g. neural networks) parameterized by an unknown parameter $\theta$, and $\mathcal{N}$ is a multivariate normal density. Parameters of this model can be found via maximum likelihood estimation using observations from (K, H) available during training $$\theta_{MLE} = \arg\max_\theta p(H, K \mid \theta) = \arg\max_\theta p(K \mid H, \theta) = \quad (8)$$

$$\arg\min_\theta \mathbb{E}_{K,H} \|K - \pi(J_\theta(H), C_\theta(H))\|_2^2 \quad (9)$$

Then the test-time inference reduces to evaluation of the regression model at given heatmaps:

$$\arg\max_{J,C} p(J, C \mid H, \theta) = J_\theta(H), C_\theta(H) \quad (10)$$

Intuitively, the parametric objective enables complex interactions between all observed heatmaps and all predicted joint locations. The resulting model outperforms the probabilistic bundle adjustment both in terms of speed and accuracy.

Solver. To solve the highly non-convex problem in (9), and to do so efficiently, some example implementations employ a modular two stages approach; See FIGS. 3 and 4 for example.

Some example implementations first acquire an initial guess $(J_{init}, C_{init})$ using single-view 3D pose estimates for the camera configuration and the 3D pose by applying rigid alignment to per-view 3D pose estimates obtained using a pre-trained weakly-supervised single-view 3D network.

Some example implementations then train a neural network $f_\theta$ to predict a series of refinement steps for camera and pose, staring from the initial guess so to optimize (9).

Advantages. This approach has several key advantages:
1. it primes the refinement stage with a "good enough" guess to start from the correct basin of the highly non-convex pose likelihood objective given multi-view heatmaps;
2. it provides a modular framework, letting us swap pre-trained modules for single-view 2D and 3D without re-training the entire pipeline whenever a better approach becomes available;
3. the neural optimizer provides orders of magnitude faster inference than classical iterative refinement, and allows the entire framework to be written within the same coherent computation framework (i.e. neural networks vs. neural networks plus classical optimization).

Example Pre-Processing Approaches

Assume that some example implementations have access to a 2D pose estimation model (e.g. PoseNet) that produces 2D localization heatmaps $h_{j,c}$ for each joint j from RGB image $\mathcal{J}_c$. Some example implementations approximate each heatmap $h_{j,c}$ with an M-component mixture of spherical Gaussians $g_{j,c}$. This compressed format reduces the dimensionality of the input to the neural optimizer. To fit parameters $g_{j,c}$ of a mixture of spherical Gaussians to a localization 2D histogram $h_{j,c}$, some example implementations treat the heatmap as a regular grid of samples weighted by corresponding probabilities, and apply weighted EM algorithm (Daniel Frisch and Uwe D. Hanebeck. Gaussian mixture estimation from weighted samples, 2021) directly to weighted samples.

Single-view pose estimation: To initialize camera parameters via rigid alignment, we need a single-image 3D pose estimation model trained without 3D supervision (e.g. EpipolarPose) that produces per-camera rough 3D pose estimates $Q=\{q_{c,j}\}$ given an image $\mathcal{J}_c$ from that camera. These single-image estimates $q_{c,j}$ are assumed to be in the camera frame, meaning that first two spatial coordinates of $q_{c,j}$ correspond to pixel coordinates of joint j on image $\mathcal{J}_c$, and the third coordinate corresponds to its single-image relative zero-mean depth estimate.

Example Initialization Approaches

Figure 5:
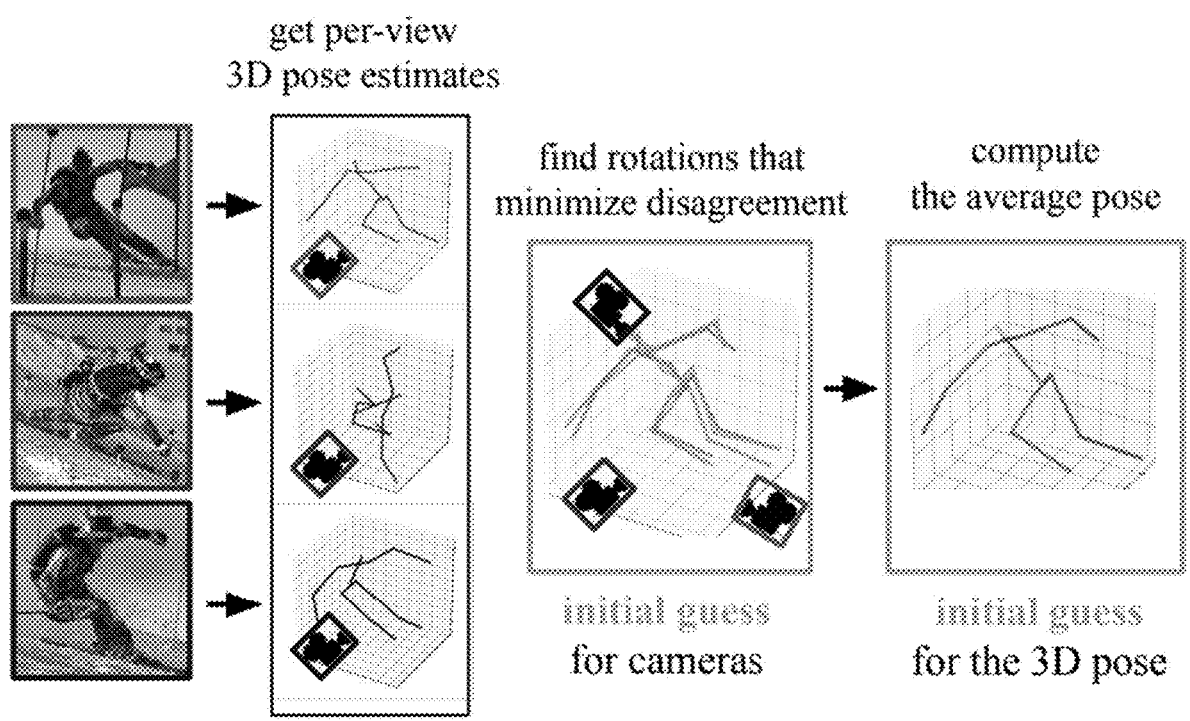
FIG. 5 illustrates an example approach for initialization according to example embodiments of the present disclosure.

FIG. 5 shows an example approach for initialization—some example implementations form an initial guess for the 3D pose and the cameras by taking the mean of rigid aligned 3D poses estimated from each RGB image using an external single-view weakly-supervised 3D pose estimation network.

More particularly, the goal of this stage is to acquire an initial guess for the 3D pose and cameras $(J_{init}, C_{init})$ using single-view rough camera-frame 3D pose estimates Q made by a model trained without 3D supervision. Some example implementations assume fixed initial parameters of the first camera $$c_0^{init}=(R_0^{init}, t_0^{init}, S_0^{init})=(I,\overline{0},1(>)) \quad (11)$$

and define initial estimates of rotations, scales and translations of remaining cameras as solutions the following orthogonal rigid alignment problem:

$$\mathrm{argmin}_{R_c,t_c,s_c} \sum_j \left\| q_{c,j} - \left(s_c \cdot R_c \cdot q_{0,j} + I_{[0:1]}^T \cdot t_c\right)\right\|^2 \quad (12)$$

that can be solved using SVD of the outer product of mean-centered 3D poses. The initial guess for the 3D pose $J_{init}$ then is the average of single-view 3D pose predictions Q rigidly aligned back into the first camera frame by corresponding estimated optimal rotations, scales and shifts:

$$J^{init} = \frac{1}{C}\sum_c R_c^T \cdot \left(q_c - I_{[0:1]}^T \cdot t_c\right)/s_c \quad (13)$$

Example Refinement Approaches

Figure 6:
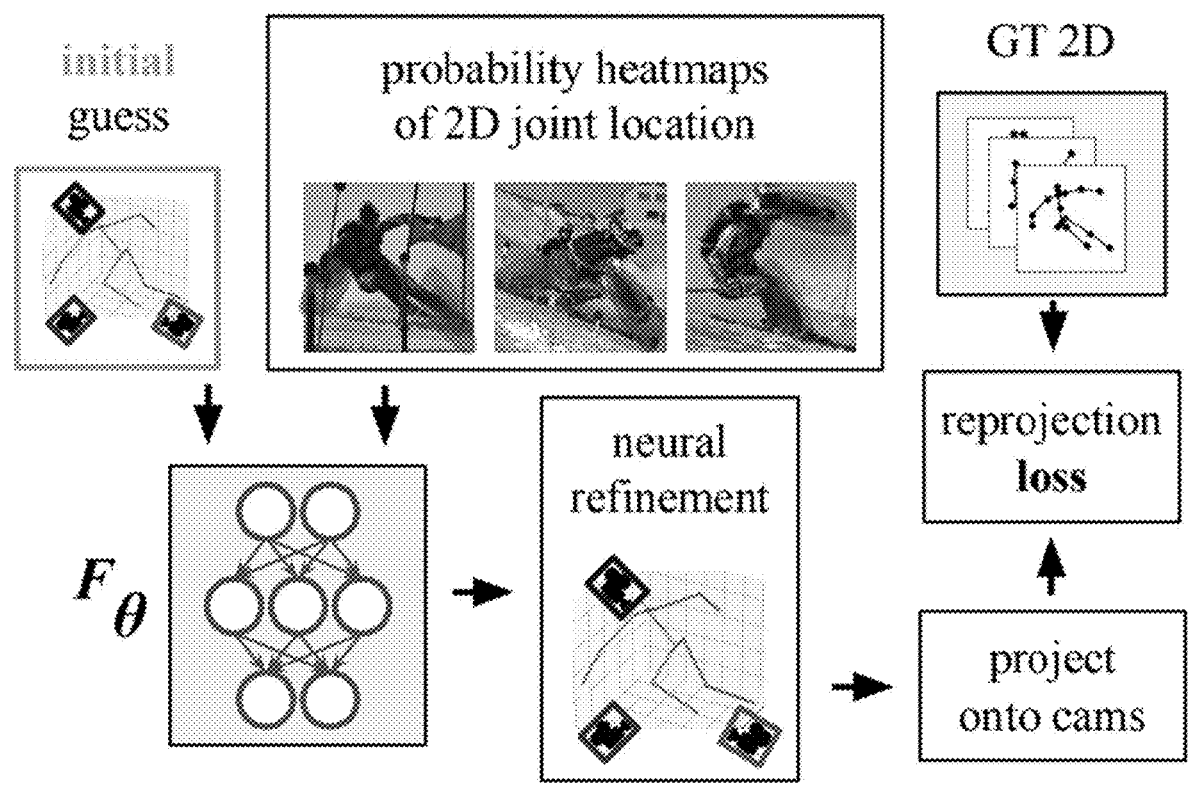
FIG. 6 illustrates an example approach for refinement according to example embodiments of the present disclosure.

FIG. 6 shows an example approach for refinement—Some example implementations train a neural optimizer $f_\theta$ to predict iterative refinement that minimizes the reprojection error with the ground truth re-projection, using the current guess and joint heatmaps as an input. During inference, some example implementations do not need ground truth 2D projections.

Some example implementations train a neural network $f_\theta$ to predict a series of updates to 3D pose and camera estimates that leads to a refined estimate starting from the initialization:

$$J^{(i+1)}=J^{(i)}+dJ^{(i)}, \ J^{(0)}=J_{init} \quad (14)$$

$$C^{(i+1)}=C^{(i)}+dC^{(i)}, \ C^{(0)}=C_{init} \quad (15)$$

To ensure that inferred camera parameters C stay valid under any update C predicted by a network, camera scale (always positive) is represented in log-scale, and camera rotation uses a continuous 6D representation [50].

At each refinement step $dJ^{(i)}$, $dC^{(i)}=\mathcal{F}_\theta^{(i)}(\ldots)$ the sub-network $\mathcal{F}_\theta^{(i)}$ of the overall network $f_\theta$ is provided with as much information as possible to perform a meaningful update towards the optimal solution:

$(J^{(i)}, C^{(i)})$—the current estimate to be refined;

$G=\{g_{j,c}\}$—a collection of Gaussian mixtures compactly representing the heatmaps density distributions;

$K^{(i)}=\{k_{j,c}^{(i)}=\pi(j_j^{(i)}, c_c^{(i)})\}$—the set of projections of each joint $j^{(i)}$ into each camera frame $c^{(i)}$;

$\mathcal{L}(J^{(i)}, C^{(i)}|G)$—the likelihood of the current estimate of joints given the heatmap mixture parameters.

These learnt updates seek to minimize the L2 distance between predicted and ground truth 2D coordinates of keypoints in each frame, mirroring the maximum likelihood objective (9) defined earlier:

$$\mathrm{argmin}_\theta \mathcal{L}_k(\theta) = \sum_{(i)}\sum_{j,c}\left\|k_{j,c}^{(i+1)} - k_{j,c}^{gt}\right\|_2^2 \quad (16)$$

where, in practice, refinement steps $\mathcal{F}_\theta^{(i)}$ are trained progressively, one after the other.

Example Model Architecture

Figure 7:
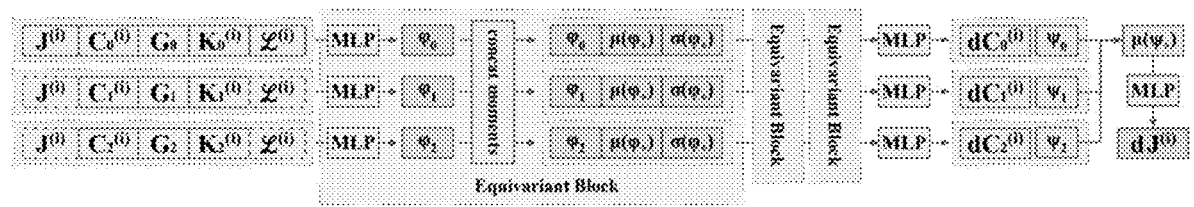
FIG. 7 illustrates an example model architecture according to example embodiments of the present disclosure.

FIG. 7 shows an example model architecture. In order for predicted updates to respect symmetries of the problem at hand, some example implementations copy and concatenate view-invariant inputs (current pose estimate, average heatmap likelihood—dashed line) to each row of view-specific inputs (current cameras and joint projections, heatmaps), pass them though a Permutation-Equivariant MLP Block shown above. To get permutation-invariant final pose update some example implementations additionally apply MLP to averaged output pose embeddings.

More particularly, the architecture of $\mathcal{F}_\theta$ can be very carefully designed to respect the symmetries of the problem at hand. The inferred updates to $J^{(i+1)}$ ought to be invariant to the order of cameras, while updates to $C^{(i+1)}$ ought to be permutation-equivariant w.r.t. the current estimates of $C^{(i)}$, rows of $K^{(i)}$, and Gaussian mixtures G. Formally, for any inputs and permutation of cameras $\sigma$:

$$dJ, dC = \mathcal{F}_\theta(J^{(i)}, C^{(i)}, G, K^{(i)}, \mathcal{L}) \quad (17)$$

$$dJ', dC' = \mathcal{F}_\theta(J^{(i)}, C_\sigma^{(i)}, G_\sigma, K_\sigma^{(i)}, \mathcal{L}) \quad (18)$$

Some example implementations can guarantee that J=J' and C=C'$_\sigma$. To archive this, some example implementations concatenate view-invariant inputs $J^{(i)}$ and $\mathcal{L}$ to each row of view-dependent inputs $C^{(i)}$, G, $K^{(i)}$, pass them though a permutation-equivariant MLP with aggregation layers concatenating first and second moments of feature vectors back to these feature vectors, and apply mean aggregation and a non-permutation-equivariant MLP to get the final pose update, as illustrated in FIG. 7.

Pose Prior (i.e. "Bone-Length" Experiment)

The modularity of the proposed solution can be illustrated by effortlessly injecting a subject-specific bone-length prior into the proposed meta-optimizer. Given two joints $j_n$ and $j_m$ connected in the human skeleton $\varepsilon$ by an edge $e=(n, m)$, some example implementations define the bone length $b_e(J)=\|j_n-j_m\|_2$. However, as the bundle adjustment is performed up to scale, some example implementations can also define scale-invariant bone lengths $b^N(J) \ b(J)/\hat{\mu}(b(J))$ by expressing length of each bone relative to the average length of other bones $\hat{\mu}(b)=(\Sigma_e b_e)/|\varepsilon|$. If we assume that during training and inference we observe noisy normalized bone-lengths vectors $B=b^N(J)+\varepsilon$, where $\varepsilon \sim \mathcal{N}(0,\sigma_b^2 I)$. Then, the joint probability (1) becomes:

$$p(J,C,K,H,B)=p(B|J)\propto(H|K)p(K|J,C)p(J)p(C)$$

and the parametric likelihood (7) becomes:

$$p(K|H,B,\theta)\propto p(K|H,\theta) \cdot \mathcal{N}(b^N(J_\theta(H,B))|B,\sigma_b^2 I)$$

and its parameters θ can be estimated equivalently to (9) via maximum over p(K,H,B|θ) using observations from p(K,H,B) available during training, effectively resulting in an additional loss term penalizing derivations of bone lengths of predicted poses from provided bone lengths:

$$\mathcal{L}_b(\theta) = \sum_{(i)} \left\| b^N(J^{(i+1)}) - B \right\|_2^2. \quad (19)$$

Example Devices and Systems

Figure 8A:
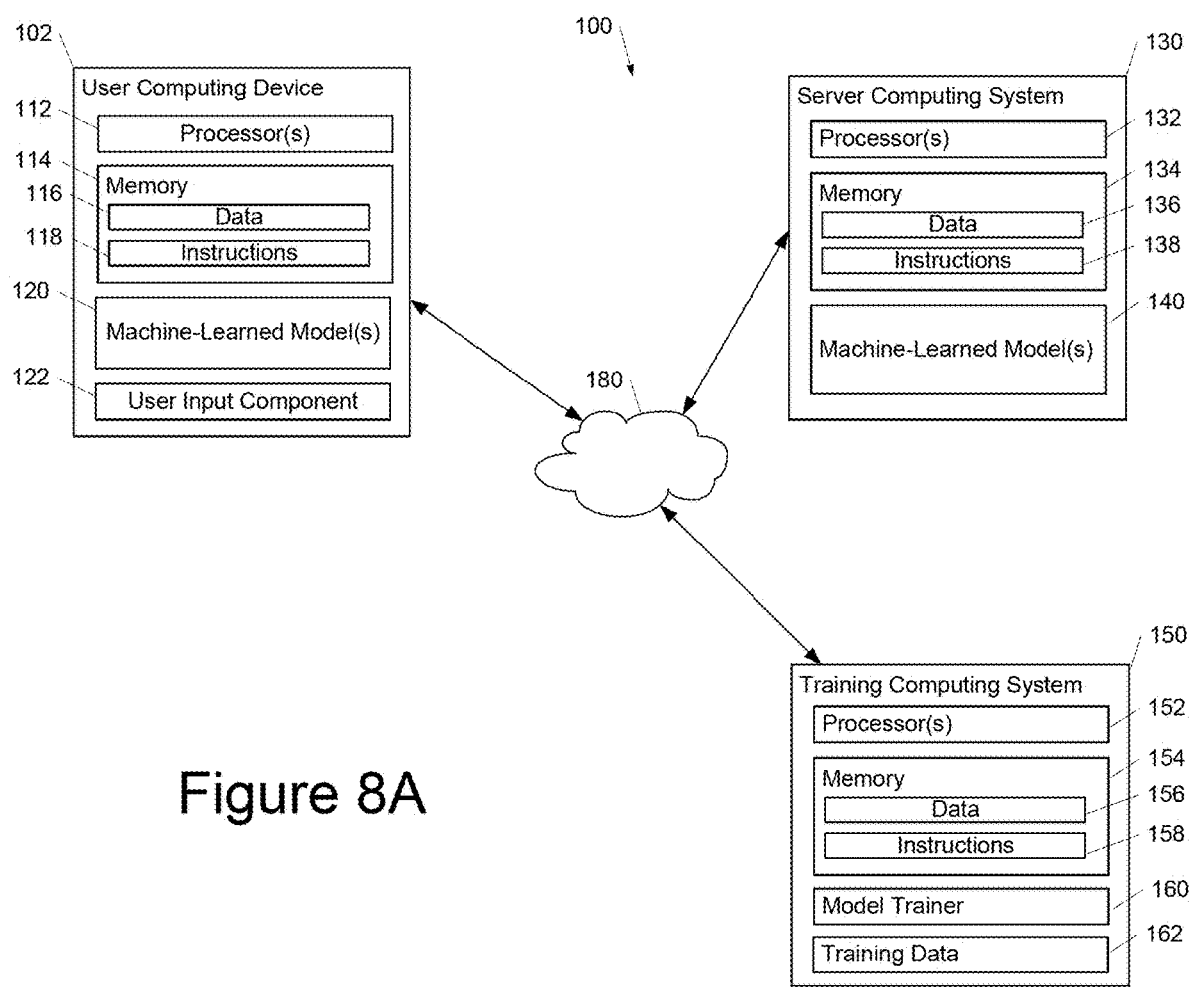
FIG. 8A depicts a block diagram of an example computing system according to example embodiments of the present disclosure.

FIG. 8A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 120 are discussed with reference to FIGS. 1-2.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel meta-optimization across multiple collections of experts).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a meta-optimization service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 140 are discussed with reference to FIGS. 1-2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases. These models may include both the expert models and the meta-optimization neural network. In some examples, the expert models may all operate on a common input. However, the expert models may provide outputs of different types (e.g. one may act as an image classifier while another may act to generate upscaled image data) while the meta-optimization neural network may generate a predicted output of a third type (e.g. 3D pose estimation as mentioned above).

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In general, the inputs referenced above may be provided to the expert models, although they may optionally be provided to the meta-optimization neural network as well. The tasks referenced above may be performed by the combination of the expert models and the meta-optimization neural network such the predicted output serves as a result of that task. Intermediate outputs, such as those from the expert models themselves, may serve to perform the same task or with other tasks mentioned above.

FIG. 8A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 8B:
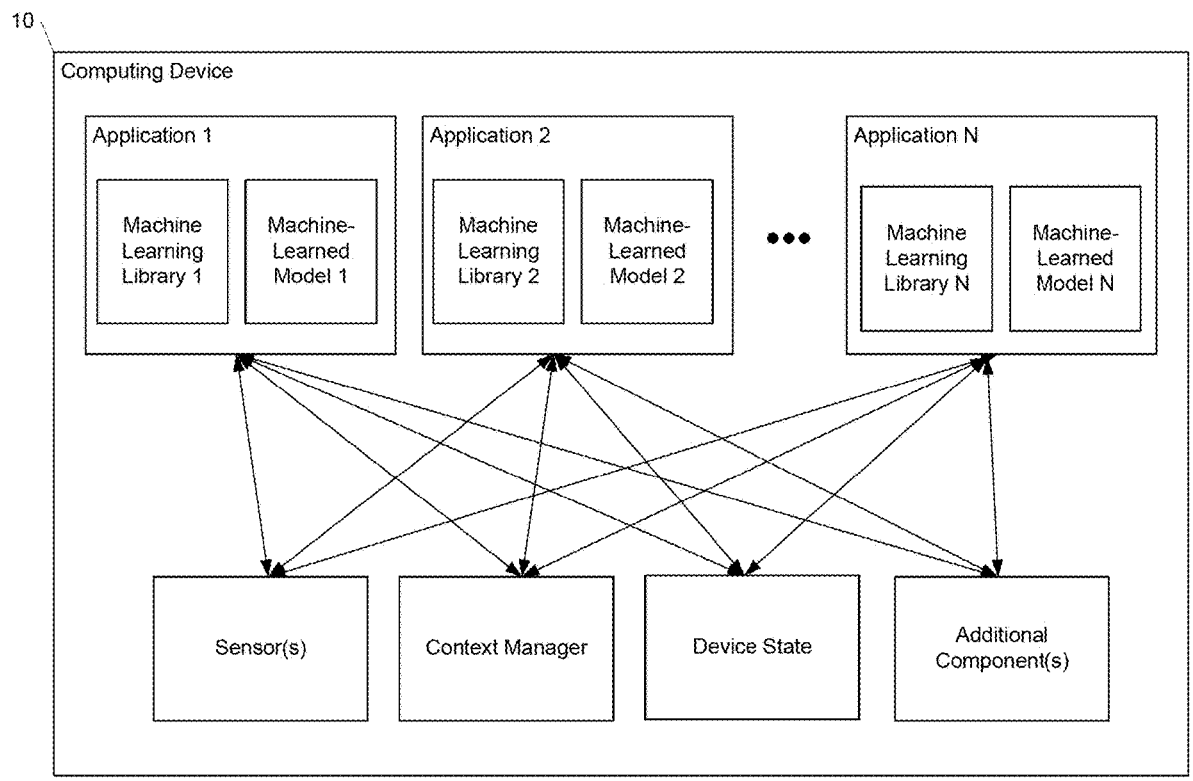
FIG. 8B depicts a block diagram of an example computing device according to example embodiments of the present disclosure.

FIG. 8B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 8B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 8C:
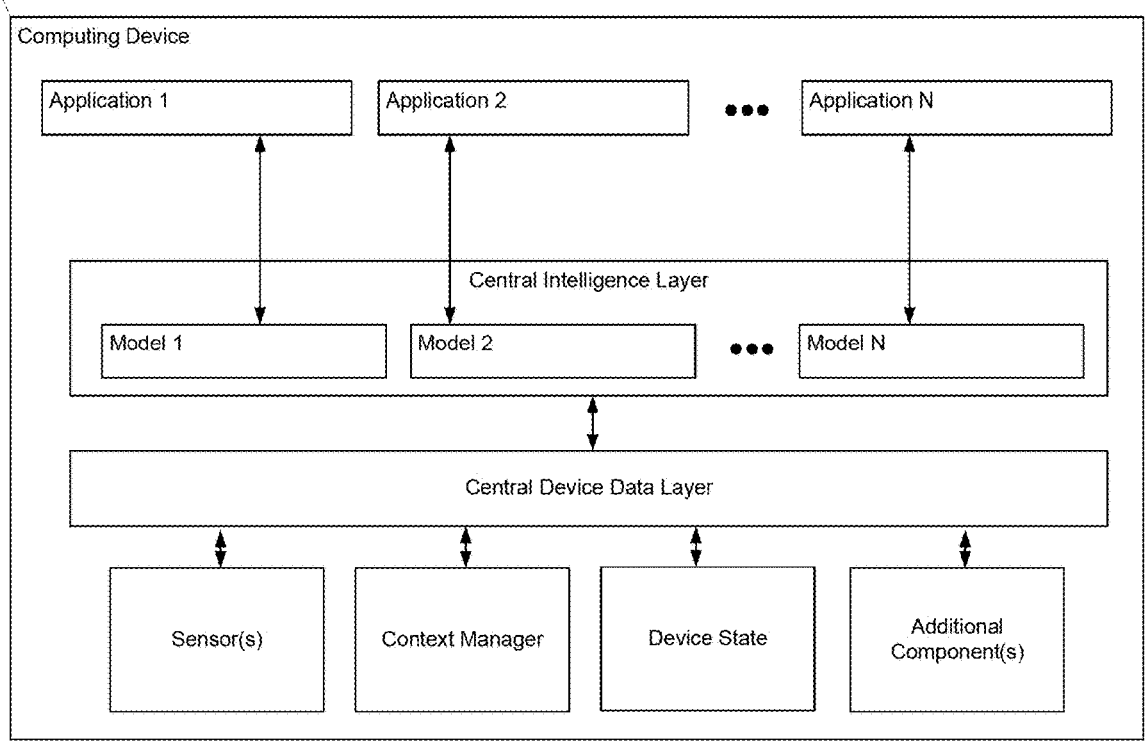
FIG. 8C depicts a block diagram of an example computing device according to example embodiments of the present disclosure.

FIG. 8C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 8C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 8C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for performing complex optimization tasks with improved efficiency or accuracy, the method comprising:
    obtaining, by a computing system comprising one or more computing devices, a set of input data, wherein the input data comprises a plurality of images that depict a scene;
    processing, by the computing system, the input data with one or more existing expert models to generate one or more expert outputs, wherein the one or more expert outputs comprise a plurality of features detected in the plurality of images;
    processing, by the computing system, the one or more expert outputs with a meta-optimization neural network to generate a predicted output;
    performing, by the computing system, an optimization technique on the one or more expert outputs to generate an optimized output, wherein performing, by the computing system, the optimization technique on the one or more expert outputs to generate the optimized output comprises performing, by the computing system, a bundle adjustment technique on the plurality of features to generate the optimized output, and wherein the optimized output comprises a geometry of the plurality of images relative to the scene; and
    modifying, by the computing system, one or more learnable parameters of the meta-optimization neural network based at least in part on a loss function that compares the predicted output with the optimized output.

2. The computer-implemented method of claim 1, wherein the optimization technique comprises an iterative minimization technique.

3. The computer-implemented method of claim 1, wherein the one or more existing expert models comprise one or more machine-learned expert models which have previously been trained to generate the one or more expert outputs.

4. The computer-implemented method of claim 1, wherein the loss function comprises one or more loss terms that encode one or more priors of the optimized output.

5. The computer-implemented method of claim 1, wherein:
    the input data comprises a sequence of inputs over time; and
    the one or more expert outputs comprise a sequence of expert outputs respectively generated over time by the one or more existing experts from the sequence of inputs over time.

6. The computer-implemented method of claim 1, wherein the one or more expert outputs have a same data structure as the optimized output and the predicted output.

7. The computer-implemented method of claim 1, wherein the one or more expert outputs comprise one or more hyperpriors.

8. The computer-implemented method of claim 1, wherein:
the plurality of images depict an object;
the one or more expert outputs comprise an initial predicted pose for the object;
the predicted output comprises a final predicted pose for the object; and
the optimized output further comprises a refined pose for the object.

9. The computer-implemented method of claim 8, wherein:
the object comprises a human body; and
the initial predicted pose, the final predicted pose, and the refined pose for the human body are parameterized using joint locations.

10. The computer-implemented method of claim 1, wherein the plurality of images comprise a plurality of monocular images.

11. A computing system, comprising:
one or more processors; and
one or more non-transitory computer-readable media that collectively store instructions that, when executed by the one or more processors, cause the computing system to perform operations, the operations comprising:
obtaining a set of input data, wherein the input data comprises a plurality of images that depict a scene;
processing the input data with one or more existing expert models to generate one or more expert outputs, wherein the one or more expert outputs comprise a plurality of features detected in the plurality of images; and
processing the one or more expert outputs with a meta-optimization neural network to generate a predicted output;
wherein the meta-optimization neural network has been trained to generate the predicted output by performance of a supervised learning approach relative to optimized outputs generated by performance of an optimization technique on initial inputs generated by the one or more existing expert models, wherein performance of the optimization technique comprises performance of a bundle adjustment technique on initial features generated by the one or more existing expert models to generate the optimized output, and wherein the optimized output comprises a geometry of the plurality of images relative to the scene.

12. The computer system of claim 11, wherein the optimization technique comprises an iterative minimization technique.

13. The computer system of claim 11, wherein the one or more existing expert models comprise one or more machine-learned expert models which have previously been trained to generate the one or more expert outputs.

14. The computer system of claim 11, wherein:
the input data comprises a sequence of inputs over time; and
the one or more expert outputs comprise a sequence of expert outputs respectively generated over time by the one or more existing experts from the sequence of inputs over time.

15. One or more non-transitory computer-readable media that collectively store instructions that, when executed by one or more processors, cause a computing system to perform operations, the operations comprising:
obtaining, by the computing system, a plurality of images that depict a scene;
processing, by the computing system, the plurality of images with one or more existing expert models to generate a plurality of features detected in the plurality of images;
processing, by the computing system, the plurality of images with a meta-optimization neural network to generate a predicted output, wherein the predicted output comprises a predicted geometry of the plurality of images relative to the scene;
performing, by the computing system, a bundle adjustment technique on the plurality of features to generate the optimized output, wherein the optimized output comprises an optimized geometry of the plurality of images relative to the scene; and
modifying, by the computing system, one or more learnable parameters of the meta-optimization neural network based at least in part on a loss function that compares the predicted geometry of the plurality of images with the optimized geometry of the plurality of images relative to the scene.

16. The one or more non-transitory computer-readable media of claim 15, wherein:
the plurality of images depict an object;
the one or more expert outputs comprise an initial predicted pose for the object;
the predicted output comprises a final predicted pose for the object; and
the optimized output further comprises a refined pose for the object.

* * * * *